United States Patent [19]
Hanson

[11] 3,834,030
[45] Sept. 10, 1974

[54] CLOSET TO PIN MEASURER

[76] Inventor: Casper H. Hanson, 44 Pasatiemp Dr., Santa Cruz, Calif. 95061

[22] Filed: June 21, 1973

[21] Appl. No.: 372,211

[52] U.S. Cl. ................................................. 33/138
[51] Int. Cl. .............................................. G01b 3/10
[58] Field of Search........... 273/32 R, 32 A; 33/137, 33/138, 139, 140, 27 C, 1 LE

[56] References Cited
UNITED STATES PATENTS

| | | | |
|---|---|---|---|
| 577,472 | 2/1897 | White | 33/138 |
| 714,172 | 11/1902 | Giles | 33/107 R |
| 789,352 | 5/1905 | Badger | 33/137 R |
| 962,702 | 6/1910 | Diracca | 33/158 X |
| 1,638,914 | 8/1927 | Brush | 33/76 R |

*Primary Examiner*—Harry N. Haroian
*Attorney, Agent, or Firm*—Moore, Zimmerman & Dubb

[57] ABSTRACT

The invention is a measuring device for determining how close to the pin that an individual golfer has driven off of the tee in hole-in-one competition on a par three hole. The measuring device includes a post which fits snugly within the golf hole, a shelf attached atop the post perpendicularly to the axis of the post, the shelf extending out over the grass so that use of the device will not damage the grass, a lid adapted to fit atop the shelf to protect the reel tape from dampness and a reel tape attached to a point in the shelf in line with the axis of the post.

4 Claims, 4 Drawing Figures

PATENTED SEP 10 1974　3,834,030

CLOSET TO PIN MEASURER

BACKGROUND OF THE INVENTION

The invention relates to a device for adding to the enjoyment of a golfer. More particularly, the device is useful in measuring how close to the pin a golfer has driven his ball during hole-in-one competition.

It is customary during golf tournaments, to award a prize or prizes, to the golfer or golfers, whose drive or drives place him or them closest to the hole or more strictly, closest to the pin which sits within the hole, on par three holes. This practice is usually followed only on par three holes because on these holes each of the golfers starts from the same position, namely the tee, and each of the golfers is expected to place his first drive upon the green.

In the past, there has not been great accuracy in measuring who was closest to the pin. Generally, one of the golfers would hold one end of a reel tape at the hole, either in the vicinity of the center of the hole or at the edge of the hole nearest to the golf ball, while the other player would unroll the reel tape and measure the distance to the ball. There was thus a great deal of uncertainty as to whose ball actually was closest to the pin since different measurers place the tape at different positions relative to the pin itself, some placing the tape at the center of the hole and others placing the tape at the edge of the hole nearest the ball.

As might be imagined in such a situation, some golfers feel at times that they have not received a fair measurement. Further, since the prizes awarded in hole-in-one competition can be quite valuable, heated arguments have occasionally resulted from disagreements on the methods of measurement to determine whose ball is closest to the pin. Still further, during the closest-to-the-pin measurement, the person holding the end of the tape adjacent the hole, may damage the turf in this very important area of the green. This is highly undesirable in that it can greatly affect the outcome of putting attempts by later players on the green.

It would be a great advantage, therefore, if a closest-to-the-pin measuring device was avaiable which would accurately, conveniently and reproducibly allow the measurement of the distance between the hole or pin and balls on the green, and which further would not damage the turf in the area of the hole. It would be still more advantageous if such a device were relatively light and easy to carry. A still further advantage would be obtained if such a device was so designed that the reel tape used therewith was protected from inclement weather.

Accordingly, it is an object of the present invention to provide a closest-to-the-pin measuring device of more accuracy than prior art devices.

Another object of the invention is to provide a closest-to-the-pin measuring device which does not damage the turf in the vicinity of the hole.

A still further object of the invention is to provide a closest-to-the-hole measuring device which always measures from the same position of the hole.

Yet another object of the invention is to provide a lightweight close-to-the-pin measuring device which accomplishes reproducible measurement of distance from the pin and is relatively weatherproof.

These and other objects of the invention are attained as set out hereinbelow.

BRIEF DESCRIPTION OF THE DRAWING

The present invention will be better understood by reference to the drawing which is hereby referred to and incorporated herein by reference thereto and wherein.

SUMMARY OF THE INVENTION

The invention comprises an accurate, convenient, waterproof, closest-to-pin measuring device. The device comprises a post adapted to snugly fit within a golf hole, a shelf attached atop said post and a reel tape adapted to fit upon said shelf, the free end of said tape being attached to said shelf in line with the axis of said post.

In a preferred embodiment, the measuring device includes a lid adapted to fit over said shelf to protect said tape from the elements.

In a more preferred embodiment, the measuring device includes a lip attached to the shelf, the lip extending into a plane perpendicular to the axis of the post and surrounding the golf hole.

A still further preference is that the post be in the form of a cylinder.

DESCRIPTION OF THE PREFERRED EMBODIMENT

The invention will be still better understood by reference to the Figures on the enclosed drawing wherein like numbers denote like parts throughout.

Figure 1:
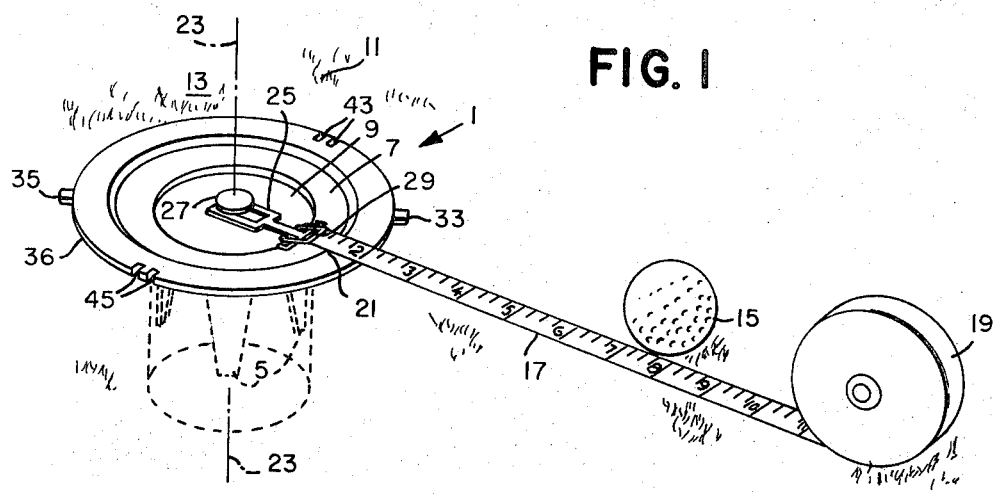
FIG. 1 is a perspective view illustrating the measuring device of the present invention while in use.
Figure 2:
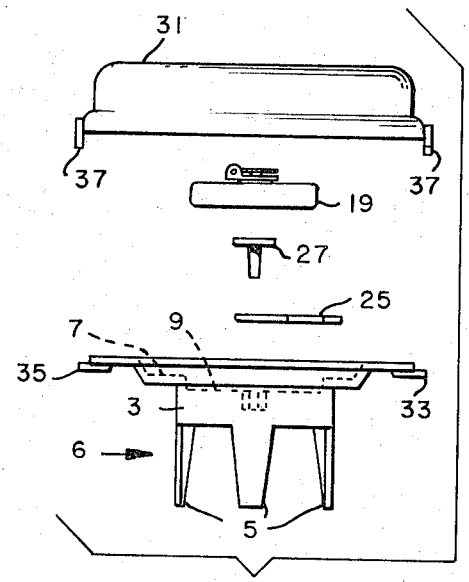
FIG. 2 illustrates in partial perspective the measuring device of the present invention with some of its parts separated from one another.
Figure 4:
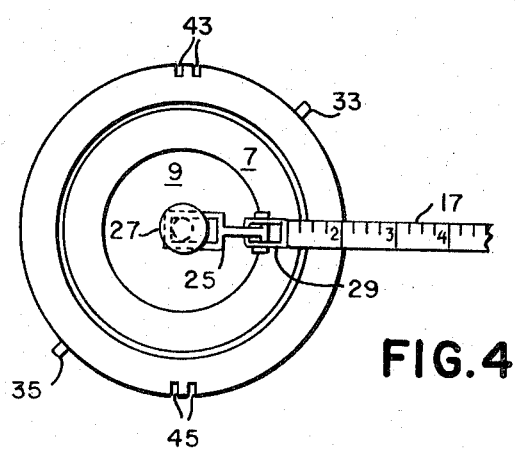
FIG. 4 illustrates section 4—4 of FIG. 3.

In FIG. 1 the closest-to-pin measuring device 1 is shown in use when inserted within a golf hole. The cylinder 3 in conjunction with the legs 5 comprise a post 6 adapted to fit snugly within a golf hole to such a depth that the lip 7 of the shelf 9 sits upon the grass 11 of the green 13. The ball 15 sits upon the green. The reel tape 17 is shown in a partly rolled-out condition from the tape holder 19. The free end 21 of the tape 17, as illustrated most clearly in FIGS. 1, 2 and 4, is attached upon the shelf 9 and in line with the axis 23 of the cylinder 3. In the embodiment of the invention illustrated in the drawing, closest-to-pin distance is measured from the edge of the hole nearest the ball 15, the free end 21 of the reel tape 17 being held in place by the detachable arm 25 which in turn is held in place by the removable pin 27. Alternatively, the free end 21 of the reel tape 17 can be held in place by the pin 27 without use of the arm 25, whereby measurement is from the center of the hole. Attachment to the free end 21 of the reel tape 17 is, in both embodiments, via the eye 29 which is attached at the free end 21 of the reel tape 17.

Figure 3:
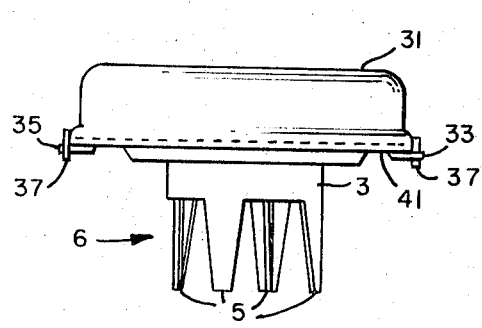
FIG. 3 is a side view illustrating the device of the present invention with the protective cover in place.

As is illustrated in FIGS. 2 and 3, a lid 31 is provided which is adapted to fit snugly over the shelf 9 and to thereby protect the reel tape 17 and the tape holder 19 from exposure to inclement weather and high humidity.

As will be apparent from FIGS. 1-3, the lip 7 is adapted to receive the lid 31 in a tight fit. Two nubs 33 and 35 are attached at the raised periphery 36 of the lip 7. The lid 31 has two hooks 37 and 39 which, when the lid 31 is placed atop the shelf 9 and the lip 7, can be positioned below the nubs 33 and 35 by rotation of the lid 31. The lid 31 further has an overhang ridge 41 adjacent the area where it mates with the lip 7 so that any rain which may fall onto the lid 31 cannot contact the shelf 9 when the lid 31 is in place.

The lip 7 also has two pairs of slots 43 and 45 located at 180° from one another. The pairs of slots are used to hook a rubber band or the like from pair 43 to pair 45 with tape holder 19 placed atop shelf 9. Thereby, tape holder 19 can be kept in place when closest-to-pin measuring device 1 is transported or carried from hole to hole.

It is preferred that the cylinder 3 of the measuring device 1 be hollow to reduce weight whereby the measuring device 1 can be readily and easily transported. The use of a hollow cylinder 3 also leads to less weight being rested by the shelf 9 upon the grass and therefore leads to less damage to the grass around the golf hole.

It is clear that any reasonable material may be used for the construction of the closest-to-pin measuring device 1 of the present invention. To minimize the costs of both construction material and manufacturing processing, it is preferred that the material utilized be plastic, e.g., polypropylene or a rigid polyester plastic.

It is clear that a number of changes can be made in the detailed construction of the closest-to-pin measuring device of the present invention without departing in any way from the scope of the invention.

It should be noted that the distances from the hole of balls located in any direction from the center of the hole can be measured quickly and accurately without repositioning the closest-to-pin measuring device 1. The golfer need only walk around the hole to the position of the ball while holding on to the tape holder 19 and the free rotation of the free end 21 of the reel tape 17 will assure that the distance to the ball is being properly measured.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An accurate, reproducible and convenient, closest-to-pin measuring device, comprising:
   1. a post adapted to fit snugly into a golf hole;
   2. a shelf attached atop said post;
   3. a reel tape adapted to fit atop said shelf, the free end of said tape being attached atop said shelf in line with the axis of said post; and
   4. a lip attached to said shelf, said lip extending into a plane perpendicular to the axis of said post and surrounding said golf hole.

2. A device as in claim 1, including a lid adapted to fit over said shelf to protect said tape from the weather.

3. A device as in claim 2, wherein said post comprises a hollow cylinder.

4. A device as in claim 1, wherein said free end of said tape is rotatably attached atop said shelf.

* * * * *